United States Patent [19]
Harrison et al.

[11] Patent Number: 5,707,723
[45] Date of Patent: Jan. 13, 1998

[54] MULTILAYER RADOME STRUCTURE AND ITS FABRICATION

[75] Inventors: Edward S. Harrison, Encinitas; James L. Melquist, San Diego; Leland H. Hemming, Poway, all of Calif.

[73] Assignee: McDonnell Douglas technologies, Inc., Huntington Beach, Calif.

[21] Appl. No.: 602,900

[22] Filed: Feb. 16, 1996

[51] Int. Cl.⁶ .................................................. B32B 3/26
[52] U.S. Cl. ................... 428/313.3; 428/34.5; 428/34.7; 428/36.5; 428/313.9
[58] Field of Search .................. 428/34.5, 34.7, 428/36.5, 313.3, 313.9

[56] References Cited

U.S. PATENT DOCUMENTS

| | | |
|---|---|---|
| 3,002,190 | 9/1961 | Oleesky et al. . |
| 3,336,873 | 8/1967 | Wilford . |
| 3,545,146 | 12/1970 | Kerr . |
| 3,713,961 | 1/1973 | Copeland et al. ............... 161/93 |
| 4,067,950 | 1/1978 | Baruschke et al. . |
| 4,102,966 | 7/1978 | Duperray et al. . |
| 4,180,605 | 12/1979 | Gilbert et al. . |
| 4,364,884 | 12/1982 | Traut . |
| 4,451,833 | 5/1984 | Traut . |
| 4,615,859 | 10/1986 | Traut . |
| 4,615,933 | 10/1986 | Traut . |
| 4,620,890 | 11/1986 | Myers et al. ............... 156/196 |
| 4,949,095 | 8/1990 | Neil et al. . |
| 4,956,393 | 9/1990 | Boyd et al. ............... 521/54 |
| 5,129,990 | 7/1992 | Binnie, Jr. et al. . |

FOREIGN PATENT DOCUMENTS

| | | |
|---|---|---|
| 0155599A2 | 9/1985 | European Pat. Off. . |
| 0357006A1 | 3/1990 | European Pat. Off. . |
| 0741435A1 | 11/1996 | European Pat. Off. . |
| 0749177A1 | 12/1996 | European Pat. Off. . |
| 1 357 003 | 6/1974 | United Kingdom . |

*Primary Examiner*—Christopher Raimund
*Attorney, Agent, or Firm*—The Bell Seltzer Intellectual Property Group of Alston & Bird LLP

[57] ABSTRACT

A radome structure has an outer first layer of a fiber-reinforced composite material of quartz fibers in a noncrystalline cured oligomeric cyanate ester pre-polymer. A second layer of a syntactic foam underlies and is bonded to the first layer. A third layer of the same fiber-reinforced composite material (although possibly of different thickness) underlies and is bonded to the second layer. A fourth layer of the syntactic foam underlies and is bonded to the third layer. A fifth layer of the same fiber-reinforced composite material (preferably of the same thickness as the first layer) underlies and is bonded to the fourth layer. The structure is formed by layup of the first layer inside a female mold, and successively shaping the remaining layers and tacking them to each preceding layer. The shell produced in this manner can be joined to conforming shells.

17 Claims, 4 Drawing Sheets

MULTILAYER RADOME STRUCTURE AND ITS FABRICATION

BACKGROUND OF THE INVENTION

This invention relates to a radome used to cover and protect a radar antenna, and, more particularly, to a composite material radome that can be formed in sections and assembled and to a method for fabricating the radome.

Radar antennas are mounted on many types of aircraft. The antenna is relatively fragile, and is usually mounted inside a radome for protection. The radome is a radar-transparent housing or shell that forms part of the outer skin of the aircraft. Depending upon the type and location of the radar antenna, the radome can be shaped and positioned as the nose of the aircraft, a portion of the wing or fuselage, or the tail of the aircraft.

The structural and electromagnetic requirements of the radome are stringent. The radome must be made of a material having sufficient strength to bear the imposed aerodynamic loadings and must have a smooth outer surface to minimize aerodynamic resistance. The material must be capable of manufacture into the radome shell structure with precise tolerances that are retained during service. The radome must be stable and retain its shape in service so that the aerodynamic properties of the aircraft are not adversely affected by shape changes. It must also be transparent to the radar signals at the frequency transmitted and received by the antenna, and have other required electromagnetic properties. Radomes must be resistant to externally induced physical damage such as bird strikes, hail, and the like for all aircraft and, additionally, projectiles in the case of military aircraft. Radomes for use in some aircraft are made of polymeric composite materials, sometimes in combination with foams that are light in weight but add rigidity to the structure.

One of the common locations for a radome is the nose section of a fighter aircraft such as the F-15 or F-18. Such a radome is in the form of an elongated, generally conical or ogival aerodynamic shell that is tapered to a point at its forward end and attached to the aircraft fuselage structure at its rearward end. The radome is a good-sized structure, being about 3 feet in diameter at its rearward end and about 5 feet long in the case of the F-18 aircraft, and about 4 feet in diameter at its rearward end and 7 feet long in the case of the F-15 aircraft.

In one manufacturing approach, such a nose radome is fabricated by filament winding composite material about a male mandrel mold to build up the required electrical thickness. This approach produces a shell after curing whose inner surface is smooth, but which must be sanded inside to the correct electrical thickness. This approach, while producing an operable radome, has the drawbacks that the radome is tuned to a narrow frequency band and is heavier than necessary to perform its structural and electromagnetic functions.

There is a need for an improved radome structure and approach to its fabrication. The present invention fulfills this need, and further provides related advantages.

SUMMARY OF THE INVENTION

The present invention provides a shell construction and approach for fabricating the shell that is particularly useful for fabricating a radome. The radome meets all structural and electromagnetic requirements for housing a radar antenna. The radome can be fabricated in sections and thereafter structurally joined. The radome shell is formed with a smooth, well-defined exterior surface that does not require machining, and maintains its precisely defined shape during service. The radome is significantly lighter in weight than the corresponding filament-wound radome.

In accordance with the invention, an article comprises a multilayer shell, preferably in the form of a radome. The shell comprises a first layer of a first-layer fiber composite material that forms the outer surface of the shell. The first-layer fiber composite material comprises a plurality of first-layer fibers embedded in a first-layer matrix comprising noncrystalline cured oligomeric cyanate ester pre-polymer. The shell further includes a second layer of a second-layer syntactic foam, and a third layer of a third-layer fiber composite material. The third-layer fiber composite material comprises a plurality of third-layer fibers embedded in a third-layer matrix comprising the noncrystalline cured oligomeric cyanate ester pre-polymer. The second layer is sandwiched between the first layer and the third layer. In each fiber composite material layer, a colloidally dispersed elastomer may be present in the cured oligomeric cyanate ester pre-polymer to improve the matrix toughness.

In a farther embodiment, the shell further includes a fourth layer of a fourth-layer syntactic foam, and a fifth layer of a fifth-layer fiber composite material. The fifth-layer fiber composite material has a plurality of fifth-layer fibers embedded in a fifth-layer matrix comprising a fifth-layer noncrystalline cured oligomeric cyanate ester pre-polymer. The fourth layer is sandwiched between the third layer and the fifth layer.

More alternating layers of syntactic foam and fiber composite material can be added, as desired, for additional strength, but at the same time adding more weight.

In accordance with another aspect of the invention, a method for preparing a multilayer shell, preferably a radome, comprises the steps of providing a female mold having an interior whose shape corresponds to an exterior shape of the shell, and providing a composite prepreg first-layer material comprising first-layer fibers embedded in a first-layer uncured matrix comprising a first-layer pre-polymeric material having an apparent glass-transition temperature of from about 40° F. to about 60° F., a high viscosity of greater than $10^6$ centipoise at ambient temperature, and a viscosity versus temperature profile which minimizes at a low value of about 100 centipoise at a temperature of about 300° F. when continuously heated at a constant rate of about 18° F. per minute from ambient temperature. The pre-polymeric material preferably comprises oligomeric cyanate ester pre-polymer, and further comprises a first-layer finely divided thickening agent. The first-layer material is shaped to the interior of the female mold at a rate sufficiently slowly that the first-layer material behaves viscously, and is simultaneously tacked to the female mold by locally warming the first-layer material to a temperature sufficiently high that the surface of the first-layer material is tacky. The method further includes providing a syntactic second-layer material comprising a plurality of hollow microballoons embedded in a second-layer matrix comprising a second-layer pre-polymeric material and a second-layer finely divided thickening agent, shaping the second-layer material to the first-layer material tacked to the interior of the female mold, and simultaneously tacking the second-layer material to the first-layer material by locally warming the second-layer material to a temperature sufficiently high that the surface of the second-layer material is tacky. A composite prepreg third-layer material is provided comprising third-layer fibers embedded in a third-layer matrix comprising a third-layer pre-polymeric material having an apparent glass-transition temperature of from about 40° F. to about 60° F., a high viscosity of greater than $10^6$ centipoise at ambient temperature, and a viscosity versus temperature profile which minimizes at a low value of about 100 centipoise at a temperature of about 300° F. when continuously heated at a constant rate of about 18° F. per minute from ambient temperature, and further comprising a third-layer finely divided thickening agent. The third-layer material is shaped to the second-layer material at a rate sufficiently slowly that the third-layer material behaves viscously, and is simultaneously tacked to the second-layer material by locally warming the third-layer material to a temperature sufficiently high that the surface of the third-layer material is tacky.

The assembly of the three layers may be pre-compacted at this point, and additional layers added, or it may be compacted and heated to cure the pre-polymers in the layers. In the former case, a syntactic fourth-layer material is provided comprising a plurality of hollow microballoons embedded in a fourth-layer matrix comprising a fourth-layer pre-polymeric material and a fourth-layer finely divided thickening agent. The fourth-layer material is shaped to the third-layer material and simultaneously the fourth-layer material is tacked to the third-layer material by locally warming the fourth-layer material to a temperature sufficiently high that the surface of the fourth-layer material is tacky. The method further includes providing a composite prepreg fifth-layer material comprising fifth-layer fibers embedded in a fifth-layer matrix comprising a fifth-layer pre-polymeric material having an apparent glass-transition temperature of from about 40° F. to about 60° F., a high viscosity of greater than $10^6$ centipoise at ambient temperature, and a viscosity versus temperature profile which minimizes at a low value of about 100 centipoise at a temperature of about 300° F. when continuously heated at a constant rate of about 18° F. per minute from ambient temperature, and further comprising a fifth-layer finely divided thickening agent. The fifth-layer material is shaped to the fourth-layer material at a rate sufficiently slowly that the fifth-layer material behaves viscously, and simultaneously the fifth-layer material is tacked to the fourth-layer material by locally warming the fifth-layer material to a temperature sufficiently high that the surface of the fifth-layer material is tacky. The assembly of five layers can then be pre-compacted if yet further pairs of layers of alternating syntactic foam and composite prepreg material are to be added. Once the assembly is complete, it is compacted and cured.

The present approach utilizes a polymer in the matrix of the prepreg fiber composite layers that permits the prepreg composite to be formed into the shape of the female mold along the interior surface of the mold and has the necessary strength and electromagnetic properties for use in the radome structure. The sheets of syntactic foam can similarly be formed against the previously applied layers of the fiber composite material.

The present multilayer fabrication approach also permits the shell to be fabricated without the use of adhesives as two or more sections that are subsequently joined together in the final structure. Joining of the sections is accomplished using structural splices and also without the need for any adhesives. The sections are co-cured together in a single operation to form the final structure. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
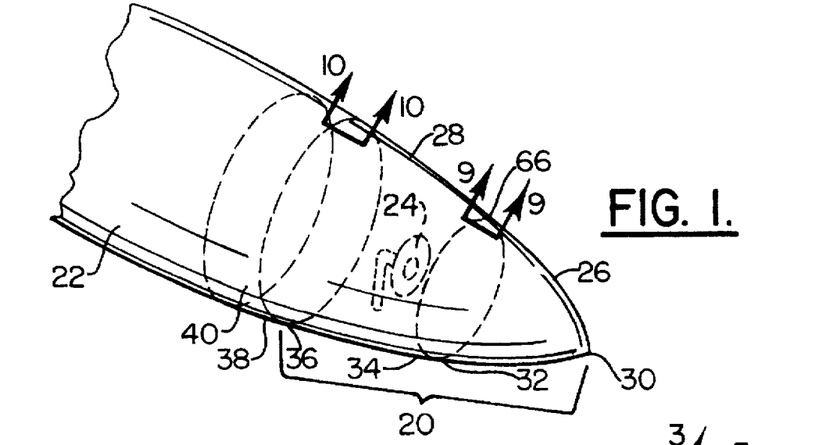
FIG. 1 is a perspective view of a radome on an aircraft.

FIG. 1 depicts a radome 20 attached to a forward end of an aircraft fuselage 22. The radome 20 is generally conical or ogival (as shown) in overall appearance in FIG. 1, inasmuch as it is depicted as the nose radome of the aircraft. The approach of the present invention is applicable to radomes of other shapes as well. A radar antenna 24 is housed within the radome 20. The illustrated radome 20 is formed of two radome sections, a forward section 26 and an aft section 28, which are separately laid up but are permanently joined together during the fabrication procedure. The radome is formed as two or more sections in this case in order to improve the manufacturability of the relatively long, narrow, closed-end article whose outer surface must be aerodynamically smooth. For a short radome, only a single forward section 26 would be used. Additional sections can be used in axial arrangement with the sections 26 and 28 to lengthen the radome, as desired.

The forward section 26 of the radome 20 is tapered outwardly from an aerodynamically pointed nose 30 to an enlarged back end 32. The aft section 28 is tapered outwardly from a front end 34 that conforms to the size and shape of the back end 32 of the forward section 26, to a back end 36 that conforms to the size and shape of a front end 38 of the fuselage 22. In the illustrated case, the from end 38 of the fuselage 22 is provided with an adapter ring 40, which can be disconnected from or opened on hinges (not shown) to permit access to the radar antenna 24 and associated electronics of the radar system.

Figure 2:
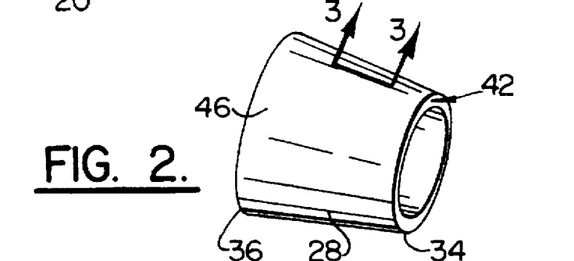
FIG. 2 is a perspective view of one section of the radome.

FIG. 2 illustrates one of the sections of the radome 20, in this case the aft section 28. The radome 20 is formed as a hollow shell 42 from multiple layers of material, as will be discussed subsequently.

Figure 3:
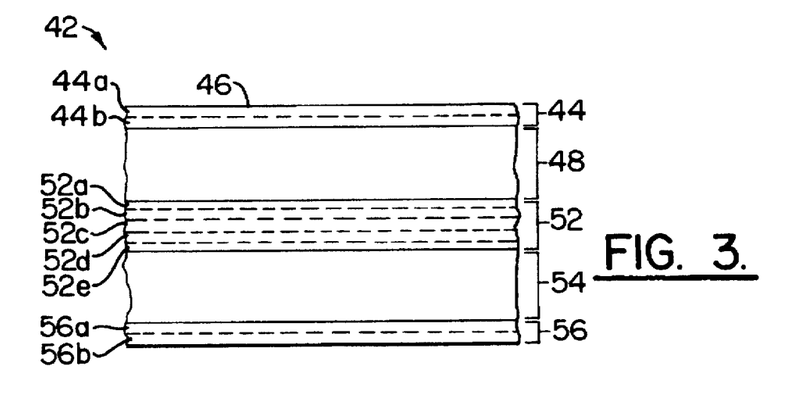
FIG. 3 is an enlarged sectional view through the radome of FIG. 2, taken along line 3—3.
Figure 4:
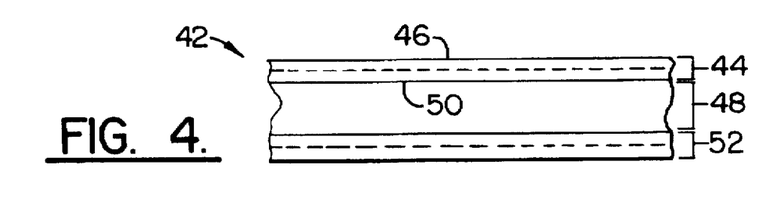
FIG. 4 is an alternative embodiment of the radome of FIG. 3.
Figure 5:
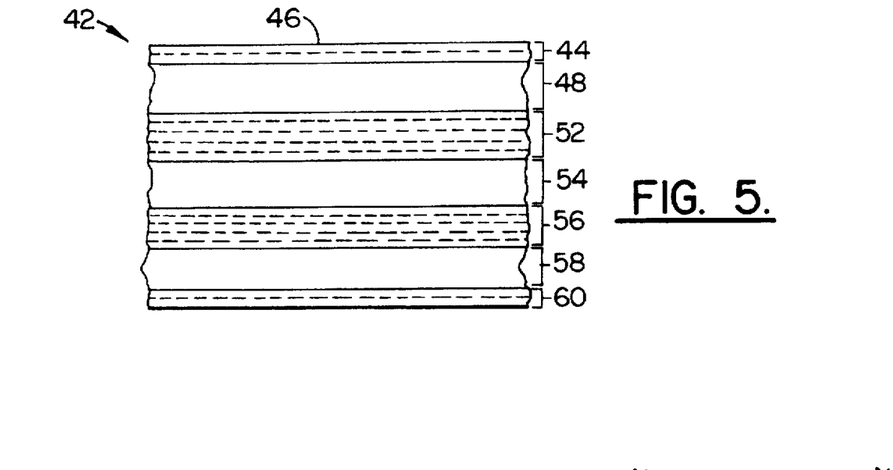
FIG. 5 is a second alternative embodiment of the radome of FIG. 3.

FIGS. 3–5 are sectional views through the shell 42 of the radome 20 showing three different structures for the shell, with FIG. 3 illustrating the most preferred structure. The shell is formed of a number of layers of material. A first layer 44 forms the exterior of the shell 42, with an external surface 46 that is aerodynamically smooth as a result of its method of preparation to be discussed subsequently. The first layer 44 is a first-layer fiber-reinforced composite material comprising a plurality of first-layer fibers embedded in a first-layer matrix. A second layer 48 lies adjacent to a second side 50 of the first layer 44. The second layer 48 is a second-layer syntactic foam. A third layer 52 lies adjacent to the second layer 48, so that the second layer 48 is sandwiched between the first layer 44 and the third layer 52. The third layer 52 is a third-layer fiber-reinforced composite material comprising a plurality of third-layer fibers embedded in a third-layer matrix. A fourth layer 54 lies adjacent to the third layer 52, so that the third layer 52 is sandwiched between the second layer 46 and the fourth layer 54. The fourth layer 54 is a fourth-layer syntactic foam. A fifth layer 56 lies adjacent to the fourth layer 54, so that the fourth layer 54 is sandwiched between the third layer 52 and the fifth layer 56. The fifth layer 56 is a fifth-layer fiber-reinforced composite material comprising a plurality of fifth-layer fibers embedded in a fifth-layer matrix.

The shell structure of FIG. 4 is similar to that of FIG. 3, except that there are only three layers, the first layer 44, the second layer 46, and the third layer 52.

The shell structure of FIG. 5 is similar to that of FIG. 3, as to the first layer 44, the second layer 48, the third layer 52, the fourth layer 54, and the fifth layer 56. Additionally, there is a sixth layer 58 lying adjacent to the fifth layer 56, such that the fifth layer 56 lies between the fourth layer 54 and the sixth layer 58. The sixth layer 58 is a sixth-layer syntactic foam. A seventh layer 60 lies adjacent to the sixth layer 58, so that the sixth layer 58 is sandwiched between the fifth layer 56 and the seventh layer 60. The seventh layer 60 is a seventh-layer fiber-reinforced composite material comprising a plurality of seventh-layer fibers embedded in a seventh layer matrix.

Additional pairs of layers (e.g., an eighth layer/ninth layer, etc.) may optionally be added to make even thicker shell structures. In all cases, the first layer facing outwardly and the last layer facing inwardly are of the fiber-reinforced composite material. The more compliant syntactic foam is enclosed within layers of the stiffer, stronger fiber-reinforced composite material.

Each of the layers of fiber-reinforced composite material is preferably composed of two or more sublayers or plies of the fiber-reinforced composite material. For example, in the preferred shell structure of FIG. 3, the first layer 44 has two sublayers 44a and 44b, the third layer 52 has five sublayers 52a, 52b, 52c, 52d, and 52e, and the fifth layer 56 has two sublayers 56a and 56b. The number of sublayers in each layer can be varied as desired in the various embodiments to achieve the desired mechanical and electromagnetic properties.

The thicknesses of the shells 42 are varied according to the number of layers present and the thickness of each layer. As an example but not by way of limitation, each of the sublayers typically has a thickness of about 0.010 inches, so that a layer with two sublayers is about 0.020 inches thick and a layer with five sublayers is about 0.050 inches thick. The thickness of the shell may be locally constant or varied from place-to-place across the surface of the shell. The thickness of a shell is most readily varied by changing the thickness of the syntactic foam layer or layers. For example, in one design the total thickness of the syntactic foam varies from about 0.220 inches near the nose tip of the radome to about 0.180 inches at the end of the core section.

Each of the layers and/or sublayers formed of a fiber-reinforced composite material can be of a different combination of constituents, relative proportions of the constituents, and arrangement of the constituents. In the preferred embodiment, however, the constituents, relative proportions, and arrangements for each of the sublayers that form the layers 44, 52, 56, and 60 are the same. In each case, the fiber reinforcement is preferably continuous quartz fibers of a diameter of about 9-14 micrometers. The preferred quartz fibers are 99.95 percent pure silica fibers that are woven into a fabric termed 581 Astroquartz II or 4581 Astroquartz 1211, which fabric is available commercially from J. P. Stevens Glass Fabrics, Slater, S.C.

Figure 7:
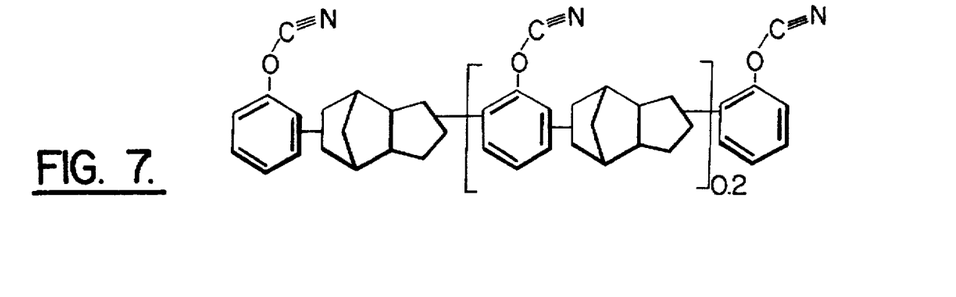
FIG. 7 is a schematic description of an oligomeric cyanate ester pre-polymer.
Figure 8:
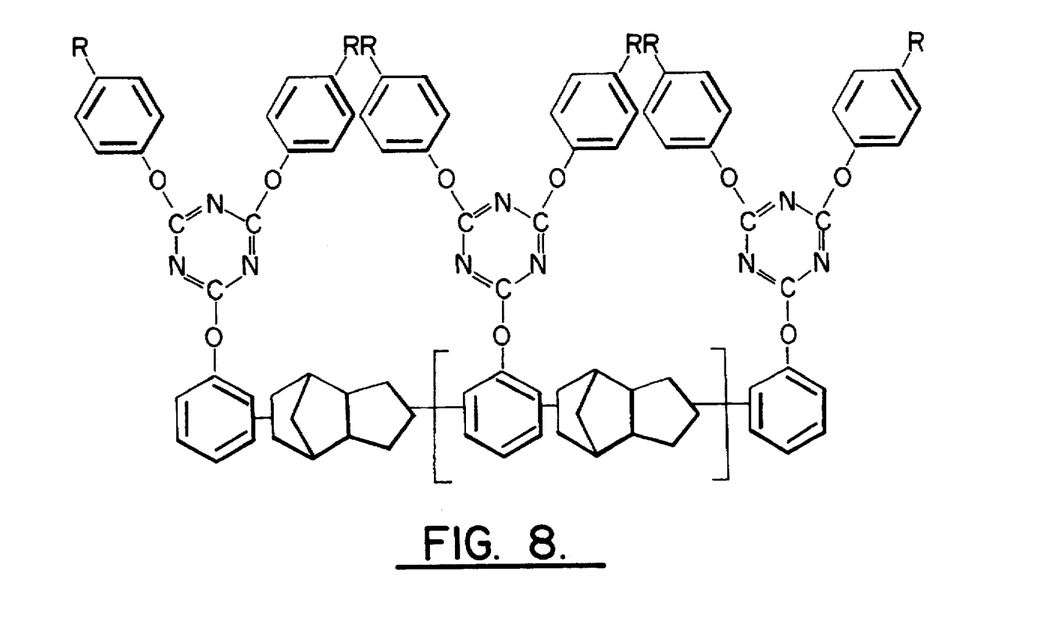
FIG. 8 is a schematic description of a polymerized cyanate based upon the oligomeric cyanate ester pre-polymer of FIG. 7.

The uncured matrix comprises a pre-polymer which has an apparent glass-transition temperature of from about 40° F. to about 60° F., which has a high viscosity of greater than $10^6$ centipoise at ambient temperature, and which exhibits a viscosity versus temperature profile which minimizes at a low value of about 100 centipoise at a temperature of about 300° F. when continuously heated at a constant rate of about 18° F. per minute from ambient temperature. The preferred pre-polymer contains phenylene cyanate ester reactive groups. The structure of the unpolymerized oligomeric cyanate ester pre-polymer is depicted in FIG. 7, and the polymerized polycyanate is depicted in FIG. 8. The pre-polymer has a large number of isomerically dissimilar components resulting in a permanent non-crystalline nature in the cured polymer. The pre-polymer is also available in a toughened form wherein colloidally dispersed elastomers are mixed into the pre-polymer. The elastomer particles are encapsulated with a polymeric hard shell, such as a polystyrene or ABS-styrene copolymer. Such a toughened pre-polymer form is available commercially from Dow Chemical. The untoughened and toughened forms may be mixed together. Such a system is available commercially from YLA, Incorporated, Benecia, Calif., as the RS-3 system. The matrix of the fiber-reinforced composite material optionally further comprises a thickener which increases the viscosity at any temperature as well as the thixotropic nature of the resin to prevent running and draining of the matrix material from the composite material during layup and prior to polymerization, in which case the system is termed RS-3MD. The thickener is preferably a finely divided powder that is mixed into the polymer precursor. The preferred thickener is silane-treated fumed silica, in an amount of from about 2-3, preferably about 2.6, weight percent of the pre-polymer. The silane-treated fumed silica is available commercially from Degussa Corp. as Aerosil R-202. In all of these forms, curing of the oligomeric cyanate ester pre-polymer produces a "noncrystalline cured oligomeric cyanate ester pre-polymer", which terminology means an oligomeric cyanate ester pre-polymer that has been cured and is in a noncrystalline form..

In the preferred fiber-reinforced composite material, the quartz fiber is present in an amount of from about 53 to about 57 volume percent of the total fiber-reinforced composite material, with the matrix (including the thickener, if any) the balance. There may be a minor but acceptable fraction of voids or impurity present as a result of the manufacturing operation.

Each of the layers formed of the syntactic foam can be of a different combination of constituents, relative proportions of the constituents, and arrangement of the constituents. In the preferred embodiment, however, the constituents, relative proportions, and arrangements for each of the layers 48, 54, and 58 are the same, although the thicknesses of the layers may be different. The syntactic foam is preferably formed of microballoons incorporated into a polymeric syntactic-foam matrix. The microballoons are preferably generally spherical high-silica microballoons distributed throughout the matrix material. The preferred microballoons are finished with an epoxylated-silane surface coupling agent and are available commercially from Emerson & Cuming, Inc., Canton, Mass. The syntactic foam matrix is preferably the same material used as the polymeric component of the fiber-reinforced layers, most preferably the RS-3MD material. The syntactic foam has a microballoon content of from about 55 to about 65 volume percent, most preferably about 60 volume percent, with the remainder the matrix material. A minor but acceptable amount of voids and impurities may also be present.

Figure 6:
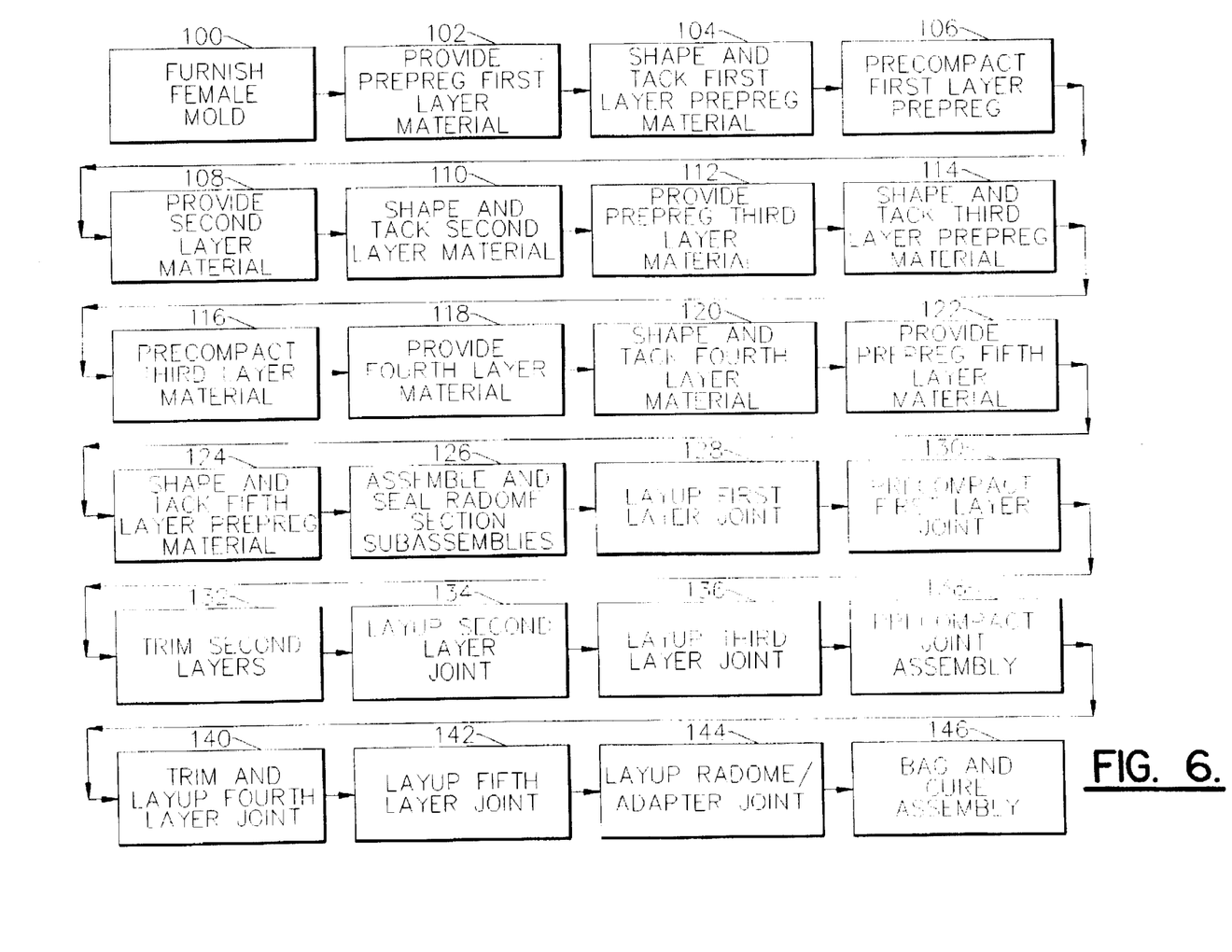
FIG. 6 is a block diagram of a method for fabricating the radome section of FIG. 2.
Figure 11:
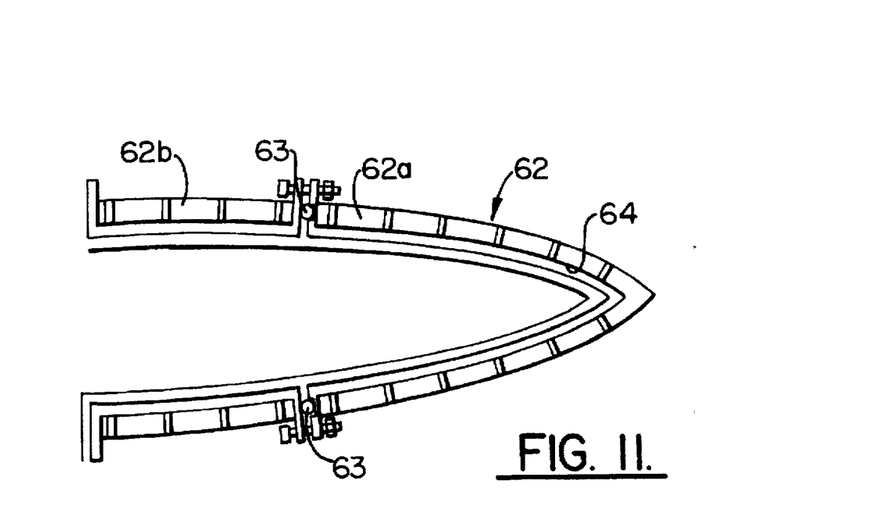
FIG. 11 is a perspective view of a female tool for layup of a radome section.

FIG. 6 depicts a preferred method for preparing the radome 20, using the five-layer preferred embodiment of the shell structure shown in FIG. 3. A female mold 62, shown in FIG. 11, is provided, numeral 100. The illustrated female mold 62 for preparing an F-18 radome is of a two-part design having two sections 62a and 62b that are joined together and sealed with an O-ring 63 in a groove. The mold is made of conventional egg-crate tooling using a composite material of carbon fiber/high-temperature epoxy with a temperature capability of 350° F. An inner surface 64 of the female mold 62 has a shape which corresponds to and defines the external surface 46 of the shell 42.

The unpolymerized composite prepreg material which forms the fiber-reinforced composite material of the first layer 44 is provided, numeral 102, as described previously. (Prior to the curing that leads to polymerization of the matrix material, the uncured fiber-reinforced composite material is termed "prepreg".) For the reduction to practice of the invention, a 36-inch wide roll of the unpolymerized composite prepreg material was prepared and stored at subambient temperature to prevent undesired curing of the polymeric components.

Sheets suitable in size and shape to form the sublayers are cut from the roll of unpolymerized composite prepreg material at ambient temperature and successively, one at a time, shaped into the interior of the mold 62 against its inner surface 64, numeral 104. Butt splices are made where the ends or sides of a sublayer join each other in the mold. The portion of the prepreg material that touches the inner surface 64 forms the external surface 46 of the shell 42 and thence of the radome 20 that is exposed to the air flow in flight. Special care is taken to ensure that the external surface is smooth and without ripples or other defects.

The uncured matrix material has an apparent glass transition temperature of about 50° F., just slightly below ambient temperature. Consequently, at ambient temperature the uncured composite material behaves in a brittle manner if deformed rapidly, but flows viscously and can be shaped if deformed slowly. Flow can be accelerated by slightly warming the uncured composite material to reduce its viscosity so as to be sufficiently pliable, as with a hot-air gun. The presence of the thickener prevents running of the uncured matrix out of the composite material.

Warming the surface of the uncured composite material also causes the matrix material to become slightly tacky (sticky). The hot air gun can therefore be used to locally heat the composite material and cause it to stick to the inner surface 64 of the mold 62. Thus, a layup technician can simultaneously shape the uncured composite material to the inner surface 64 and tack the surface of the uncured composite material to the inner surface 64.

To ensure a good aerodynamic external surface 46 and a void-free mold/prepreg interface, the first layer prepreg is precompacted, numeral 106, under conditions that remove bubbles and discontinuities in the prepreg and force its surface into close contact with the inner surface 64 of the mold 62. The precompaction is accomplished by placing a rubber bladder against the exposed surface of the first layer prepreg, so that the first layer prepreg is between the inner surface 64 and the bladder. Conventional bleeder film, breather film, barrier film, and porous membranes are also provided between the rubber bladder and the composite material. The interior of the bladder is evacuated, so that the prepreg material is not exposed to air. A pressure of about 100 pounds per square inch (psi) is applied to the bladder. The assembly is heated at 3°–5° F. per minute to 225° F., held at 225° F. for 10–15 minutes, and cooled to ambient temperature with the pressure applied. The precompaction is sufficient to obtain flow and removal of voids and other defects in the layup, assuring adequate surface tack to prevent subsequent slump/flow of the materials during layup, but not sufficient to cause the curing of the matrix material. (Several precompaction cycles are used during the course of the fabrication, and all use this same combination of precompaction steps just described.)

A piece of the second-layer syntactic foam material which is precompacted and molded to shape in matched metal molds is provided, numeral 108, in the manner previously discussed. The piece of uncured second-layer material is shaped to lie against the inwardly facing surface of the first-layer prepreg material, numeral 110. Shaping is accomplished by relatively slow deformation and the use of warming to reduce the viscosity of the pre-polymer, to assure intimate surface contact. The local heating also permits the second-layer material to be tacked to the first-layer material in the manner previously discussed. Because the initially flat sheet of relatively thick syntactic foam material is formed into arcs, there can be gaps left in the gore section of the mold. These gaps are filled with cut-to-size pieces of the syntactic foam material and hand worked into place to form a continuous second layer. These pieces all bond together during the curing cycle.

Pieces of the third-layer fiber-composite prepreg material are provided, numeral 112. In the preferred case, five sublayers are furnished from the sheets of the prepreg material. The third-layer sublayers are successively, one at a time, shaped and tacked to the second-layer syntactic foam material in the manner described previously for the first-layer fiber-composite material, numeral 114. After the application of the sublayers is complete, the entire assembly of first layer, second layer, and third layer is precompacted in the manner previously described, numeral 116.

A piece of the fourth-layer syntactic foam is provided, numeral 118. The fourth-layer syntactic foam is shaped and tacked to the exposed surface of the third-layer prepreg, numeral 120.

Pieces of the fifth-layer fiber-composite prepreg material are provided, numeral 122. In the preferred case, two sublayers are furnished from the sheets of the prepreg material. The fifth-layer sublayers are successively, one at a time, shaped and tacked to the fourth-layer syntactic foam material in the manner described previously for the first-layer fiber-composite material, numeral 124.

The layup is complete for the shell structure of FIG. 3. To prepare a shell with the structure of FIG. 4, only steps 100–114 would be performed. To prepare a shell with the structure of FIG. 5, additional steps of supplying, shaping, and tacking the sixth and seventh layers would be performed, comparable to the steps of supplying, shaping, and tacking the fourth and fifth layers, respectively. Thicker shells can be prepared by adding additional pairs of layers. In all cases, the nature and thickness of the layers can be varied according to design parameters furnished to the manufacturing operation. The present invention is concerned with the structure and manufacturing of the predesigned shell, not with the determination of the numbers, content beyond that described herein, and thicknesses of the layers.

Returning to the description of the manufacturing operation for the five-layer shell, the assembly of first layer, second layer, third layer, fourth layer, and fifth layer for any one section is complete. In the case of the two-section radome of FIG. 1, both the forward section 26 (in mold section 62a) and the aft section 28 (in mold section 62b) are laid up in the manner just described. The two large sections are prepared separately because experience has shown that the hand layup of a large, elongated structure that is closed at one end and is relatively narrow compared to the dimensions of a person is quite difficult. The sectional approach allows the layup to be more readily performed, but the sections must next be joined together and joined to the adapter ring 40 or fuselage of the aircraft.

Figure 9:
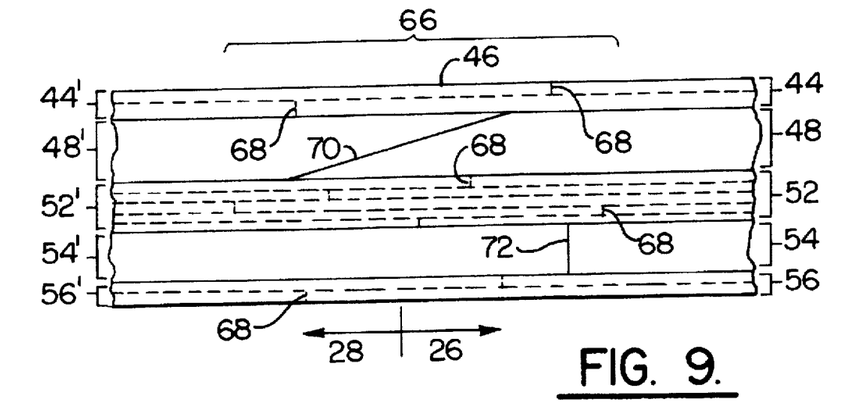
FIG. 9 is an enlarged sectional view through the joint between the forward and aft radome sections, taken along line 9—9 of FIG. 1.

The female mold tooling 62 for the sections is mechanically joined and sealed with the O-ring 63 for a pressure-tight seal, numeral 126. A joint 66 between the composite assemblies is then prepared. The location of this joint 66 relative to the entire radome 20 is shown in FIG. 1, and a detail of the joint 66 is shown in FIG. 9. The joint 66 is depicted as made between two sections with the same numbers and types of layers, the usual case for the radome fabrication. The previously described layers 44, 48, 52, 54, and 56 of the forward section 26 are shown to the fight side of FIG. 9, and the corresponding layers 44', 48', 52', 54', and 56' of the aft section 28 are shown to the left side of FIG. 9. A principle of the arrangement of the joint 66 is to distribute the load transition of the joint over an axial length of the radome 20, so that there is a shear load transfer between the sections and no plane of weakness to serve as a site for premature failure of the joint 66 and thence the radome 20. To this end, when the layers 44, 52, 56, 44', 52', and 56' are laid up, the layers and sublayers are left of different lengths so that, when interleaved and contacted against their corresponding layers of the other section, the butt joints are not aligned. Examples of the butt joints 68 of these layers illustrate this staggered arrangement of the butt joints 68 of the individual layers. The load transfers between the sections are accomplished by shear loads, not the axial loadings at the butt joints. The joint 66 is therefore distributed over a distance, typically about 2 inches. In preparation for this layup approach, the sublayers of the layers 44, 44', 52, 52', 56, and 56' are left of different corresponding lengths in the steps 104, 114, and 124.

In the actual preparation of the joint 66, the first layers 44 and 44' are laid up such that the sublayers have the axially staggered butt joint arrangement shown in FIG. 9, numeral 128. If there is an overlap of corresponding sublayers, they are trimmed to length. The first-layer joint is precompacted in the manner previously described, numeral 130, to ensure a smooth external surface 46 in the region of the joint 66.

The second layers 48 and 48' of syntactic foam are trimmed to form a tapered joint 70, numeral 132. One form of the tapered joint 70, with the join line in a continuously inclined form, is shown in FIG. 9. After trimming the second layers 48 and 48' to form the desired arrangement of the joint, they are laid up into place, numeral 134.

The third layers 52 and 52' are laid up in the staggered manner described for the first layers, numeral 136.

The assembly of first-layer, second-layer, and third-layer joints is precompacted, numeral 138.

The fourth layers 54 and 54' of syntactic foam are trimmed and laid up, numeral 140, corresponding to the steps 132 and 134 for the first layers. By way of illustration of other possible joints, a butt joint 72 is illustrated for the fourth layers 54 and 54'. In normal practice, the same type of joint (tapered 70 or butt 72) would be used for both the second-layer joints and the fourth-layer joints to avoid unbalanced load distribution, but FIG. 9 shows both types of joints used in the same structure for illustration.

The fifth layers 56 and 56' are laid up in the staggered manner described for the first layers, numeral 142.

Figure 10:
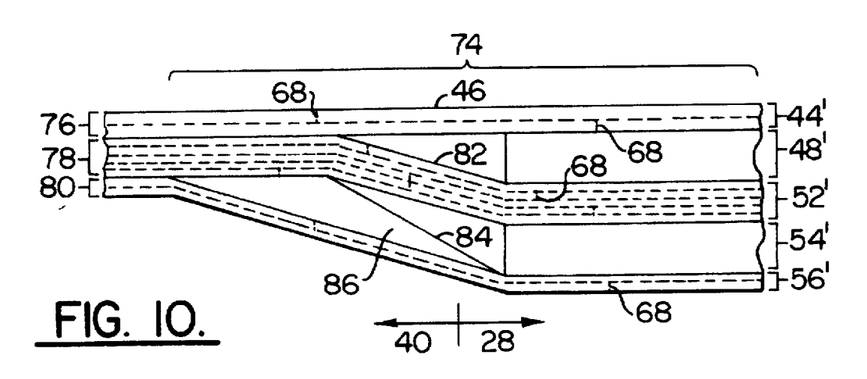
FIG. 10 is an enlarged sectional view through the joint between the aft radome section and the aircraft fuselage, taken along line 10—10 of FIG. 1.

The layup of the joint 66 is complete.

Where an adapter ring 40 is used (or where the radome is to be integrally joined to the fuselage 22), a further joint 74 between the aft section 28 and the adapter ring 40 is fabricated. This joint 74 differs from the joint 66 in that the adapter ring 40 is typically fabricated only from composite material layers and does not include any syntactic foam layers. The joint 74 must therefore accommodate a thickness change while maintaining a smooth external surface 46, the termination of the syntactic foam layers 48' and 54', and the distribution of the joint load transitions axially as was accomplished for the joint 66.

The preferred form of the joint 74 is illustrated in FIG. 10 for the usual case where the number of fiber-reinforced composite layers 76, 78, and 80 of the adapter ring 40 is the same as the number of layers 44', 52', and 56' in the aft section 28, and the number of sublayers in each layer is also the same. The joint 74 is laid up and precompacted in a progressive manner from outer to inner layers in the same manner as the joint 66 of FIG. 9, numeral 144, with the following exceptions. The syntactic layers 48' and 54' are terminated such that loads are transferred by shear into the composite layers 76, 78, and 80. In some cases, such as the illustrated second-layer termination 82, termination and shear transfer are accomplished simply by a tapered or flat shear joint. In other cases, such as the illustrated fourth-layer termination 84, the use of a simple shear joint would leave an irregular structure in the joint 74 that might cause the surface 46 to bulge or sag during service, and also would create internal stresses that could lead to incomplete load transfer and premature failure at the joint 74. In such cases, an insert 86 of the same syntactic foam material as used in the layer 54' is cut, inserted at the termination 84, and worked and tacked into place in the manner previously described. During curing, the insert 86 bonds to the adjacent layers and provides a smoothed shape and load transition.

The entire assembly, including the laid-up pieces and the molds, is vacuum bagged and cured, numeral 146. Only a single cure cycle is required, even though no adhesives are used to hold the assembly together prior to the cure. Instead, the tacking approach is sufficient to maintain the integrity of the assembly prior to the cure. The assembly is bagged using a single-ply 120 glass bleeder cloth over porous Armalon and standard perforated film and breather packs, and the bag is evacuated. These bagging procedures are well known in the art for other types of laid-up composite structures. The assembly is stored in the bag pending curing.

To accomplish the preferred cure, the bagged assembly is placed into an autoclave and cured in a number of steps that follow each other successively. In the first cure step, the interior of the bag is under a forepump vacuum. The autoclave is pressurized to 100 psi and the autoclave temperature increased at a rate of about 3° F. per minute to about 222° F.±5° F., with the maximum air temperature 230° F. The temperature is held for 16±0.1 hours. After the first 4 hours of hold is complete, the internal pressure in the vacuum bag is released and returned to ambient pressure.

The unusually long 16 hour hold period at 222° F. serves several purposes. There is a continuing de-bulking and devolatilization of the entire layup assembly through the four-hour period of vacuum application. A constant cure temperature is maintained through first vitrification and gelation to ensure the lowest net resin cure shrinkage, thereby minimizing internal stresses in the final radome. The effective no-flow condition of the matrix is maintained during gelation. The destructive exotherm associated with the curing of the syntactic foam layers is controlled. The approximately 60 volume percent content of the microballoons in the syntactic foam causes the insulative properties of the microballoons to offset the reduction of reacting mass of the polymeric material, resulting in an increase in the exothermic character of the material. The 16 hour hold period avoids adverse consequences of the heat generation, inasmuch as vitrification occurs at about 10–11 hours into the hold period and gelation occurs at about 13–14 hours, for the preferred RS-3MD material.

In the second cure step, the autoclave temperature is increased at a rate of 3° F. per minute to 250° F.±5° F. and held for 1±0.1 hours. The internal pressure in the vacuum bag is ambient and the applied pressure to the surface of the bag is 100 psi.

In the third cure step, the autoclave temperature is increased at a rate of 3° F. per minute to 275° F.±5° F. and held for 2±0.1 hours. The internal pressure in the vacuum bag is ambient and the applied pressure to the surface of the bag is 100 psi.

In the fourth cure step, the autoclave temperature is increased at a rate of 3° F. per minute to 315° F.±5° F. and held for 2±0.1 hours. The internal pressure in the vacuum bag is ambient and the applied pressure to the surface of the bag is 100 psi.

In the fifth cure step, the autoclave temperature is increased at a rate of 3° F. per minute to 350° F.±5° F. and held for 3±0.1 hours. The internal pressure in the vacuum bag is ambient and the applied pressure to the surface of the bag is 100 psi.

In the sixth cure step, the autoclave temperature is decreased at a rate of 2° F. per minute to 250° F.±10° F. and held for 1±0.1 hours. The internal pressure in the vacuum bag is ambient and the applied pressure to the surface of the bag is 100 psi.

In the seventh cure step, the autoclave temperature is decreased at a rate of 5° F. per minute to 150° F.±10° F. and held for 1±0.1 hours. The internal pressure in the vacuum bag is ambient and the applied pressure to the surface of the bag is 100 psi until the temperature reaches 150° F. The applied pressure is then reduced to ambient.

After the seventh cure step is complete, the autoclave heater is turned off, the door is opened, and the assembly is cooled to ambient temperature and removed from the autoclave.

Fabrication of the radome 20, including the joints 66 and 74 where present, requires only a single cure cycle. Because the cure cycle is quite long, manufacturing the radome using only a single cure cycle effects considerable savings in manufacturing cost and time. The vacuum bag and molds 62 for the assembly are removed.

A freestanding post-cure cycle of the radome is performed in an oven heated successively heated to 350° F. for 15 minutes, 375° F. for one hour, 400° F. for one hour, and 425° F. for 90 minutes.

The preferred approach has been used to fabricate prototype radomes for both the F-18 and F-15 aircraft. These radomes weigh about 20 pounds and 50 pounds, respectively, which is about 22 percent less than the conventional filament-wound radomes.

The present approach provides a radome that has low moisture absorption, low shrinkage, a glass transition temperature of about 420° F., acceptable strength and toughness, and low electromagnetic permittivity values. The radome is fabricated without the use of adhesives and without machining except for aft termination and mounting holes. The radome also is stable in service. Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An article comprising a multilayer shell, the shell comprising:

a first-layer of a first-layer fiber composite material, the first-layer fiber composite material comprising a plurality of first-layer fibers embedded in a first-layer matrix comprising noncrystalline cured oligomeric cyanate ester pre-polymer, a second layer formed of a second-layer syntactic foam; and a third layer of a third-layer fiber composite material, the third-layer fiber composite material comprising a plurality of third-layer fibers embedded in a - first-layer matrix comprising the cured noncrystalline oligomeric cyanate ester prepolymer, the second-layer being sandwiched between the first layer and the third-layer and said cured prepolymer of the first and third layers having the following formula:

2. The article of claim 1, wherein the first-layer fibers and the third-layer fibers are quartz fibers.

3. The article of claim 1, wherein the first-layer matrix and the third-layer matrix each further comprise a finely divided thickening agent.

4. The article of claim 1, wherein the second-layer syntactic foam comprises microballoons embedded in a polymeric material.

5. The article of claim 4, wherein the polymeric material is noncrystalline cured oligomeric cyanate ester prepolymer.

6. The article of claim 1, wherein the article further includes:

a fourth layer of a fourth-layer syntactic foam;

a fifth layer of a fifth-layer fiber composite material, the fifth-layer fiber composite material having a plurality of fifth-layer fibers embedded in a fifth-layer matrix comprising cured noncrystalline oligomeric cyanate ester pre-polymer, the fourth layer being sandwiched between the third layer and the fifth layer.

7. The article of claim 1, wherein the shell has the shape of a radome.

8. The article of claim 1, wherein the shell has the shape of a radome.

9. The article of claim 3, wherein the thickening agent is present in an amount from about 2 to about 3 weight percent of the total of thickening agent and pro-polymer.

10. An article comprising a multilayer shell, the shell comprising:

a first-layer of a first-layer fiber composite material, the first-layer fiber composite material comprising a plurality of first-layer fibers embedded in a first-layer matrix comprising noncrystalline cured oligomeric cyanate ester pre-polymer and a finely divided thickening agent of silica particles;

a second layer formed of a second-layer syntactic foam; and a third layer of a third-layer fiber composite material, the third-layer fiber composite material comprising a plurality of third-layer fibers embedded in a - first-layer matrix comprising the cured noncrystalline oligomeric cyanate ester prepolymer and a finely divided thickening agent of silica particles, the second-layer being sandwiched between the first layer and the third-layer.

11. The article of claim 10, wherein the cured noncrystalline oligomeric cyanate ester pre-polymer is of the following formula:

14. The article of claim 10, wherein the second-layer syntactic foam comprises microballoons embedded in a polymeric material.

15. The article of claim 14, wherein the polymeric material is a non-crystalline cured oligomeric cyanate ester pre-polymer.

16. The article of claim 10, wherein the article further includes:

a fourth layer of a fourth-layer syntactic foam; and a fifth layer of a fifth-layer fiber composite material, the fifth-layer fiber composite material having a plurality of fifth-layer fibers embedded in a fifth-layer matrix comprising cured noncrystalline oligomeric cyanate ester pre-polymer, the fourth layer being sandwiched between the third layer and the fifth layer.

17. An article comprising a multilayer shell, the shell comprising:

a first-layer of a first-layer fiber composite material, the first-layer fiber composite material comprising a plurality of first-layer fibers embedded in a first-layer matrix comprising noncrystalline cured oligomeric cyanate ester pre-polymer and a finely divided thickening agent, wherein the thickening agent is present in an amount of from about 2 to about 3 weight percent of the total of thickening agent and pre-polymer;

a second layer formed of a second-layer syntactic foam; and a third layer of a third-layer fiber composite material, the third-layer fiber composite material comprising a plurality of third-layer fibers embedded in a - first-layer matrix comprising the cured noncrystalline oligomeric cyanate ester prepolymer and a finely divided thickening agent, wherein the thickening agent is present in an amount of from about 2 to about 3 weight percent of the 12. The article of claim 10, wherein the first-layer fibers and the third-layer fibers are quartz fibers.

13. The article of claim 10, wherein the thickening agent is present in an amount of from about 2 to about 3 weight percent of the total of thickening agent and pre-polymer.

total of thickening agent and pre-polymer, the second-layer being sandwiched between the first layer and the third-layer.

* * * * *